United States Patent
Sampathkumar et al.

(10) Patent No.: US 10,003,463 B2
(45) Date of Patent: Jun. 19, 2018

(54) SYSTEMS AND METHODS FOR REVOKING AND REPLACING SIGNING KEYS

(71) Applicant: Dell Products L.P., Round Rock, TX (US)

(72) Inventors: Kala Sampathkumar, Bangalore (IN); Elie Antoun Jreij, Pflugerville, TX (US); Ajeesh Kumar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 180 days.

(21) Appl. No.: 14/885,082

(22) Filed: Oct. 16, 2015

(65) Prior Publication Data

US 2017/0111171 A1    Apr. 20, 2017

(51) Int. Cl.
*H04L 29/06*    (2006.01)
*H04L 9/08*    (2006.01)

(52) U.S. Cl.
CPC ................... *H04L 9/0891* (2013.01)

(58) Field of Classification Search
None
See application file for complete search history.

(56) References Cited

U.S. PATENT DOCUMENTS

| | | | | |
|---|---|---|---|---|
| 5,680,458 | A * | 10/1997 | Spelman | H04L 9/0891 380/277 |
| 6,246,767 | B1 * | 6/2001 | Akins, III | H04L 63/04 348/E5.004 |
| 9,659,171 | B2 | 5/2017 | Treweek et al. | |
| 9,674,162 | B1 * | 6/2017 | Miller | H04L 63/0435 |
| 9,893,885 | B1 * | 2/2018 | Miller | H04L 9/0861 |
| 2003/0108204 | A1 * | 6/2003 | Audebert | H04L 9/083 380/277 |
| 2005/0251680 | A1 * | 11/2005 | Brown | H04L 63/061 713/171 |

(Continued)

OTHER PUBLICATIONS

Toor, Yasser; Muhlethaler, Paul; Laouiti, Anis; De La Fortelle, Arnaud. Vehicle Ad Hoc Networks: Applications and Related Technical Issues. IEEE Communications Surveys & Tutorials. vol. 10, Issue: 3. Pub. Date: 2008. http://ieeexplore.ieee.org/stamp/stamp.jsp?tp=&arnumber=4625806.*

(Continued)

*Primary Examiner* — Jeremiah Avery
(74) *Attorney, Agent, or Firm* — Jackson Walker, L.L.P.

(57) ABSTRACT

In accordance with embodiments of the present disclosure, an information handling system may include a processor, an information handling resource communicatively coupled to the processor, and a management controller communicatively coupled to the processor and the information handling resource and configured to provide out-of-band management of the information handling system. The management controller may further configured to receive a message indicating that an existing private key associated with the information handling resource is compromised, the message including a replacement public key for replacing an existing public key associated with the information handling resource and associated with the existing private key and responsive to the message, cause the existing public key associated with the information handling resource to be replaced with the replacement public key.

21 Claims, 2 Drawing Sheets

(56) References Cited

U.S. PATENT DOCUMENTS

| | | | | |
|---|---|---|---|---|
| 2006/0294355 A1* | 12/2006 | Zimmer | ............... | G06F 21/572 713/2 |
| 2012/0204032 A1* | 8/2012 | Wilkins | ............... | H04L 9/006 713/170 |
| 2012/0311332 A1* | 12/2012 | Johnsen | ............... | H04L 9/3234 713/168 |
| 2015/0052596 A1* | 2/2015 | Ayanam | ............... | G06F 21/572 726/8 |
| 2015/0237502 A1* | 8/2015 | Schmidt | ............... | H04W 12/10 726/7 |
| 2017/0161506 A1 | 6/2017 | Gates et al. | | |

OTHER PUBLICATIONS

Krishnaswamy, Dilip; Hasbun, Robert N.; Brizek, John P. Secure Manageable Mobile Handset Platform Architectures. IEEE Communications Magazine. vol. 44, Issue: 9. Pub. Date: 2006. http://ieeexplore.ieee.org/stamp/stamp.jsp?tp=&arnumber=1705993.*

* cited by examiner

SYSTEMS AND METHODS FOR REVOKING AND REPLACING SIGNING KEYS

TECHNICAL FIELD

The present disclosure relates in general to information handling systems, and more particularly to methods and systems for revoking and replacing signing keys used to authenticate firmware of information handling resources.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Peripheral devices and other information handling resources of information handling systems often include firmware stored on or accessible to such information handling resources which may be executed by control logic of the information handling resources to carry out functionality of the information handling resource. Oftentimes, a manufacturer of a device may provide an update or upgrade to firmware for a device, in order to add or improve functionality to remedy a bug in a previous firmware version.

In order to provide assurance that a firmware update is genuine and from the manufacturer or other trusted source, a firmware image often has embedded therein a public key. Firmware updates are often embedded with the same public key and signed with a private key of the public-private key pair including the public key. When a manufacturer pushes a firmware update, the existing firmware may verify the authenticity of the update by authenticating the signature of the update with the public key embedded in the existing firmware.

However, one disadvantage to this approach is that a private key may be compromised if a hacker comes into possession of the private key, if a disgruntled employee of the manufacturer absconds with the private key, and/or another person with harmful intent obtains the private key. Such a person with harmful intent could then use the private key to sign malicious code purporting to be a genuine firmware update. Because an existing firmware of a device may perceive the purported firmware update as genuine, such device may be updated with the malicious code. In some instances, the malicious code may also prevent an administrator or other user of the device from issuing further updates to the device.

SUMMARY

In accordance with the teachings of the present disclosure, the disadvantages and problems associated with existing approaches to security assurance of information handling resource firmware updates may be reduced or eliminated.

In accordance with embodiments of the present disclosure, an information handling system may include a processor, an information handling resource communicatively coupled to the processor, and a management controller communicatively coupled to the processor and the information handling resource and configured to provide out-of-band management of the information handling system. The management controller may further configured to receive a message indicating that an existing private key associated with the information handling resource is compromised, the message including a replacement public key for replacing an existing public key associated with the information handling resource and associated with the existing private key and responsive to the message, cause the existing public key associated with the information handling resource to be replaced with the replacement public key.

In accordance with embodiments of the present disclosure, a method may include receiving a message indicating that an existing private key associated with an information handling resource is compromised, the message including a replacement public key for replacing an existing public key associated with the information handling resource and associated with the existing private key and responsive to the message, causing the existing public key associated with the information handling resource to be replaced with the replacement public key.

In accordance with embodiments of the present disclosure, an article of manufacture may include a non-transitory computer-readable medium and computer-executable instructions carried on the computer-readable medium, the instructions readable by a processor, the instructions, when read and executed, for causing the processor to receive a message indicating that an existing private key associated with an information handling resource is compromised, the message including a replacement public key for replacing an existing public key associated with the information handling resource and associated with the existing private key and responsive to the message, cause the existing public key associated with the information handling resource to be replaced with the replacement public key.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
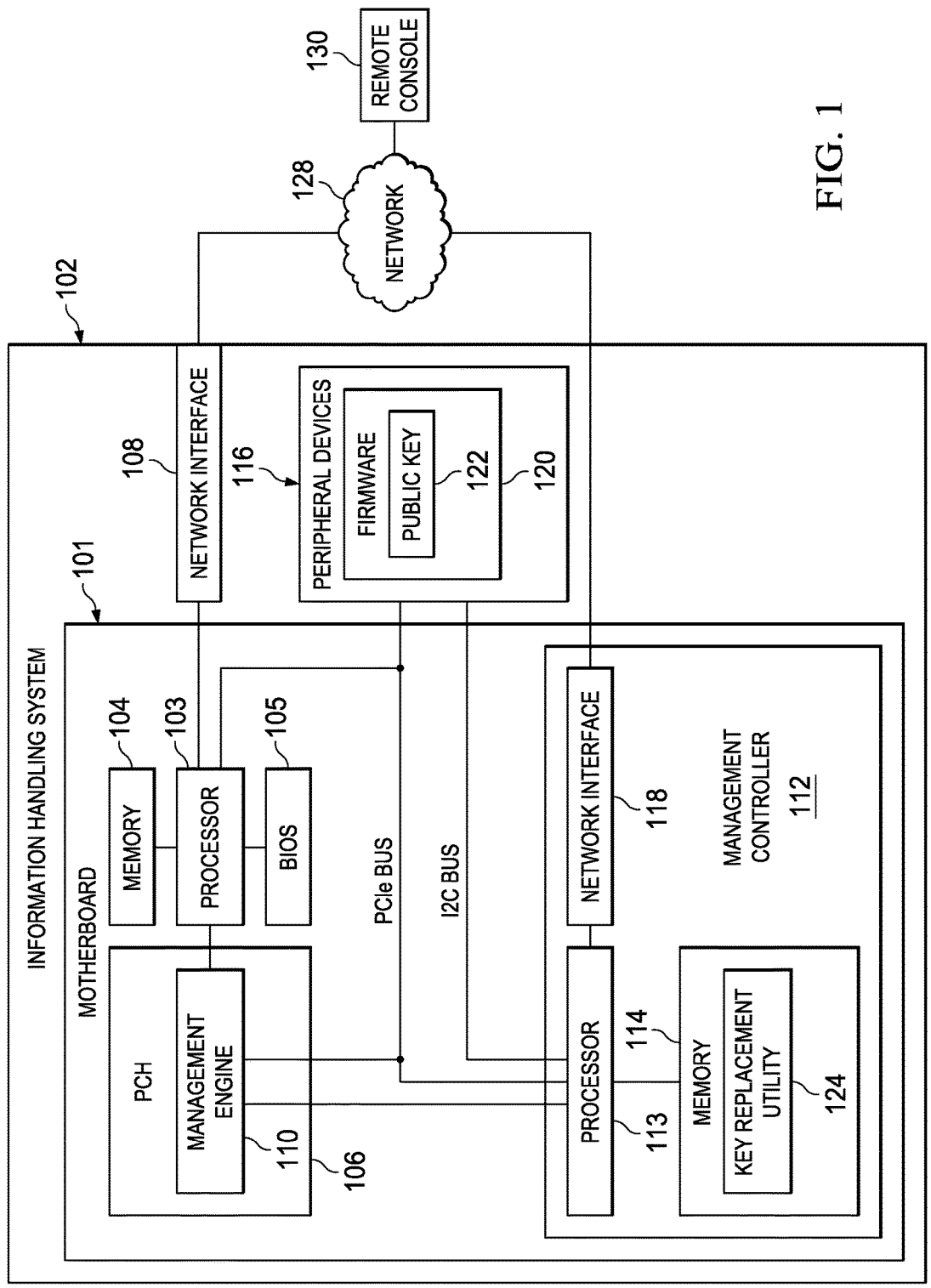
FIG. 1 illustrates a block diagram of an example information handling system, in accordance with embodiments of the present disclosure.
Figure 2:
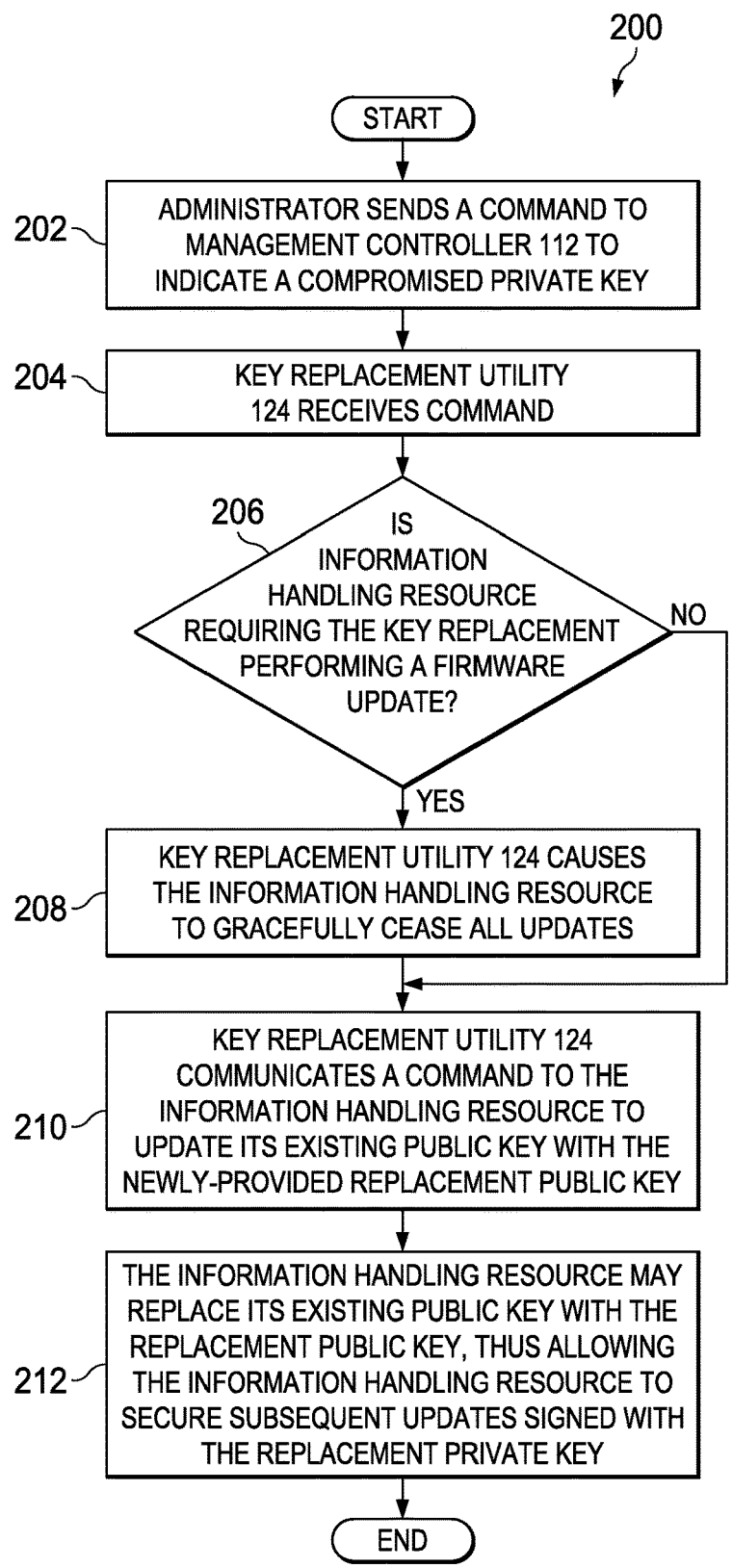
FIG. 2 illustrates a flow chart of an example method for replacing a public key for an information handling resource, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an information handling system 102. In some embodiments, information handling system 102 may comprise or be an integral part of a server. In other embodiments, information handling system 102 may be a personal computer. In these and other embodiments, information handling system 102 may be a portable information handling system (e.g., a laptop, notebook, tablet, handheld, smart phone, personal digital assistant, etc.). As depicted in FIG. 1, information handling system 102 may include a motherboard 101, a network interface 108 communicatively coupled to a processor 103 of motherboard 101, and one or more peripheral devices 116 communicatively coupled to processor 103.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include processor 103, a memory 104 communicatively coupled to processor 103, a platform controller hub (PCH) 106 communicatively coupled to processor 103, and a management controller 112 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off. Although memory 104 is depicted in FIG. 1 as integral to motherboard 101, in some embodiments, all or a portion of memory 104 may reside external to motherboard 101.

PCH 106 may be any system, device, or apparatus configured to control certain data paths (e.g., data flow between processor 103, memory 104, and peripherals) and support certain functions of processor 103. A PCH 106 may also be known as a "chipset" of an information handling system 102. One such function may include management engine 110. Management engine 110 may comprise hardware and/or firmware that enables remote out-of-band management for information handling system 102 in order to monitor, maintain, update, upgrade, and/or repair information handling system 102. In some embodiments, management engine 110 may include hardware and firmware compliant with Intel's Active Management Technology.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., memory 104) may be executed by processor 103 and given control of information handling system 102.

Management controller 112 may be configured to provide out-of-band management facilities for management of information handling system 102. Such management may be made by management controller 112 even if information handling system 102 is powered off or powered to a standby state. Management controller 112 may include a processor 113, memory 114, and an out-of-band network interface 118 separate from and physically isolated from in-band network interface 108. In certain embodiments, management controller 112 may include or may be an integral part of a baseboard management controller (BMC), a remote access controller (e.g., a Dell Remote Access Controller or Integrated Dell Remote Access Controller), or an enclosure controller. In other embodiments, management controller 112 may include or may be an integral part of a chassis management controller (CMC).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102 or management controller 112.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off. Memory 114 may have stored thereon software and/or firmware which may be read and executed by processor 113 for carrying out the functionality of management controller 112.

As shown in FIG. 1, memory 114 may have stored thereon a key replacement utility 124. Key replacement utility 124 may include any system, device, or apparatus configured to receive an instruction to replace a key for an information handling resource (e.g., peripheral device 116) and responsive to such instruction, cause firmware of such information handling resource to be replaced with such key. Example functionality of key replacement utility 124 is set forth in greater detail below. In some embodiments, key replacement utility 124 may be implemented as a program of instructions that may be read by and executed on processor 113 to carry out the functionality of key replacement utility 124.

Network interface 118 may comprise any suitable system, apparatus, or device operable to serve as an interface between management controller 112, network 128, and/or one or more other information handling systems. Network interface 118 may enable management controller 112 to communicate using any suitable transmission protocol and/or standard. In these and other embodiments, network interface 118 may comprise a network interface card, or "NIC."

Network interface 108 may comprise any suitable system, apparatus, or device operable to serve as an interface between information handling system 102, network 128, and/or and one or more other information handling systems. Network interface 108 may enable information handling system 102 to communicate using any suitable transmission protocol and/or standard. In these and other embodiments, network interface 108 may comprise a network interface card, or "NIC."

Peripheral device 116 may be communicatively coupled to processor 103 and may generally include any information handling resource. As shown in FIG. 1, peripheral device 116 may also be coupled to processor 103 via an inter-integrated circuit (I2C) bus and/or via a PCIe bus. Processor 103 can communicate directly to peripheral devices via PCIe except for some messages that require a PCIe root complex. For these messages, management engine 110 may serve as a proxy between processor 103 and peripheral device 116. As shown in FIG. 1, a peripheral device 116 may have stored thereon (or in computer-readable media accessible to peripheral device 116) firmware 120. Firmware 120 may include any program of instructions that may be executable by control logic of peripheral device 116 in order to carry out the functionality of peripheral device 116. As depicted in FIG. 1, firmware 120 may have embedded therein a public key 122. Public key 122 may comprise a vendor-provided public key (e.g., provided by a manufacturer or other trusted source of peripheral device 116) which may be associated with a private key that may be used by the vendor to sign firmware updates to firmware 120.

Network 128 may be a network and/or fabric configured to couple information handling system 102, remote console 130, and/or one or more other information handling systems to one another. In these and other embodiments, network 128 may include a communication infrastructure, which provides physical connections, and a management layer, which organizes the physical connections and information handling systems communicatively coupled to network 128. Network 128 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 128 may transmit data via wireless transmissions and/or wireline transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 128 and its various components may be implemented using hardware, software, or any combination thereof.

Remote console 130 may comprise any information handling system including requisite hardware, software, and/or firmware for interfacing with management controller 112 via network interface 118 in order to facilitate remote management of information handling system 102 by remote console 130. In some embodiments, such remote management may be in accordance with Intelligent Platform Management Interface (IPMI) and/or another suitable interface or standard.

FIG. 2 illustrates a flow chart of an example method for replacing a public key for an information handling resource (e.g., a peripheral device 116), in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, in response to a private key for an information handling resource being stolen or otherwise compromised, an administrator may remotely log on (e.g., via remote console 130) to management controller 112 and send a command (e.g., via a web services application programming interface, command line interface, etc.) to indicate a compromised private key. Such command may also include identifying information of the peripheral device 116 or other information handling resource for which the private key has been compromised. The command may alternatively or additionally include a new public key corresponding to a new private key that replaces the compromised private key.

At step 204, key replacement utility 124 of management controller 112 may receive the command and determine from the command the information handling resource requiring the key replacement. At step 206, key replacement utility 124 may determine whether the information handling resource requiring the key replacement is performing a firmware update. If the information handling resource requiring the key replacement is performing a firmware update, method 200 may proceed to step 208. Otherwise, method 200 may proceed to step 210.

At step 208, in response to the information handling resource requiring the key replacement performing a firmware update, key replacement utility 124 may cause the information handling resource to gracefully cease all updates.

At step 210, key replacement utility 124 may communicate a command to the information handling resource to update its existing public key with the newly-provided replacement public key. In some embodiments, such command may be over a secure internal communication bus, thus ensuring that any such command for replacing a public key has greater assurance of being genuine. For example, in some embodiments, the PCIe bus between management controller 112 and peripheral device 116 may implement a secure communications channel in management controller transport protocol (MCTP) over PCIe. As another example, for information handling resources that do not support MCTP over PCIe, MCTP over I2C may be used. As yet another example, for other information handling resources (e.g., a basic input/output system or "BIOS"), communication may be via Keyboard Controller Style (KCS). At step 212, in response to the command, the information handling resource may replace its existing public key with the replacement public key, thus allowing the information handling resource to secure subsequent updates signed with the replacement private key. After the completion of step 212, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using system 200 or any other system operable to implement method 200. In certain embodiments, method 200 may be implemented partially or fully in software and/or firmware embodied in computer-readable media.

The systems and methods described above may provide a secure mechanism in which to replace public keys associated with compromised private keys. The systems and methods described herein may also be automated for large installations using scripts or one-to-many remote consoles 130 that can communicate to a plurality of management controllers 112.

In additional or alternate embodiments, instead of the remote console 130 in the first instance communicating a command to management controller 112 to replace a public key (e.g., steps 202 and 204, above), the management controller 112 may instead periodically communicate an inquiry to remote console 130 or another information handling system whether a key replacement is needed. If the private key has been compromised, the remote console 130 may respond with an appropriate message in response to the periodic check of management controller 112 (which may be similar to the command of step 202 above), thus allowing management controller 112 to obtain the replacement public key and communicate it to the appropriate device. Such embodiments may be useful for installations behind a firewall where communication may not be originated from outside the firewall.

In these and other embodiments, an information handling resource may be configured to check with management controller 112 before accepting any firmware update. In response to an information handling resource checking with management controller 112, management controller 112 may communicate an inquiry to remote console 130 or another information handling system whether a key replacement is needed before allowing any firmware update to proceed. Thus, in addition or alternatively to management controller 112 periodically inquiring whether a private key has been compromised, similar inquiries may be triggered by information handling resources attempting firmware updates.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
a processor;
an information handling resource communicatively coupled to the processor; and
a management controller communicatively coupled to the processor and the information handling resource and configured to provide out-of-band management of the information handling system, wherein the out-of-band management includes management of the information handling system when the information handling system is in a powered off state, the management controller being further configured to:
receive a first message from the information handling resource regarding a firmware update for the information handling resource, wherein the information handling resource is configured to check, via the first message, whether the firmware update should be accepted;
receive a second message indicating that an existing private key associated with the information handling resource and with the firmware update is compromised, the second message including a replacement public key for replacing an existing public key associated with the information handling resource and associated with the existing private key; and responsive to the second message, cause the existing public key associated with the information handling resource to be replaced with the replacement public key.

2. The information handling system of claim 1, wherein the management controller is further configured to, responsive to the second message:
determine if the information handling resource is performing another firmware update;
and cease the another firmware update.

3. The information handling system of claim 1, wherein the existing public key is embedded in firmware of the information handling resource, and causing the existing public key associated with the information handling resource to be replaced with the replacement public key comprises replacing the existing public key with the replacement public key within the firmware.

4. The information handling system of claim 1, wherein the management controller is further configured to:
communicate an inquiry to a remote information handling system to determine if the existing private key has been compromised; and receive the second message in response to the inquiry.

5. The information handling system of claim 4, wherein the management controller is configured to periodically communicate the inquiry.

6. The information handling system of claim 4, wherein the management controller is configured to communicate the inquiry in response to the first message.

7. The information handling system of claim 1, wherein the management controller is configured to cause the existing public key associated with the information handling resource to be replaced with the replacement public key by communicating via one of:
management controller transport protocol (MCTP) over Peripheral Component Interconnect Express; MCTP over Inter-Integrated Circuit; and
Keyboard Controller Style.

8. A method comprising:
a management controller communicatively coupled to an information handling system and an information handling resource of the information handling system receiving a first message from the information handling resource regarding a firmware update for the information handling resource, wherein the information handling resource is configured to check, via the first message, whether the firmware update should be accepted;
the management controller receiving a second message indicating that an existing private key associated with the information handling resource and with the firmware update is compromised, the second message including a replacement public key for replacing an existing public key associated with the information handling resource and associated with the existing private key;
and responsive to the second message, the management controller causing the existing public key associated with the information handling resource to be replaced with the replacement public key;
wherein the management controller is configured to provide out-of-band management of the information handling system, the out-of-band management including management of the information handling system when the information handling system is in a powered off state.

9. The method of claim 8, further comprising, responsive to the second message:
determining if the information handling resource is performing another firmware update;
and ceasing the another firmware update.

10. The method of claim 8, wherein the existing public key is embedded in firmware of the information handling resource, and causing the existing public key associated with the information handling resource to be replaced with the replacement public key comprises replacing the existing public key with the replacement public key within the firmware.

11. The method of claim 8, further comprising:
communicating an inquiry to a remote information handling system to determine if the existing private key has been compromised; and receiving the second message in response to the inquiry.

12. The method of claim 11, further comprising periodically communicating the inquiry.

13. The method of claim 11, further comprising communicating the inquiry in response to the first message.

14. The method of claim 8, wherein causing the existing public key associated with the information handling resource to be replaced with the replacement public key comprises communicating via one of:
management controller transport protocol (MCTP) over Peripheral Component Interconnect Express;
MCTP over Inter-Integrated Circuit;
and Keyboard Controller Style.

15. An article of manufacture comprising:
a non-transitory computer-readable medium; and
computer-executable instructions carried on the computer-readable medium, the instructions readable by a processor, the instructions, when read and executed, for causing the processor to:

receive, at a management controller communicatively coupled to an information handling system and an information handling resource of the information handling system, a first message from the information handling resource regarding a firmware update for the information handling resource, wherein the information handling resource is configured to check, via the first message, whether the firmware update should be accepted;

receive, at the management controller, a second message indicating that an existing private key associated with the information handling resource and with the firmware update is compromised, the second message including a replacement public key for replacing an existing public key associated with the information handling resource and associated with the existing private key; and responsive to the second message, cause the existing public key associated with the information handling resource to be replaced with the replacement public key, wherein the management controller is configured to provide out-of-band management of the information handling system, the out-of-band management including management of the information handling system when the information handling system is in a powered off state.

16. The article of claim 15, the instructions for further causing the processor to, responsive to the second message:
   determine if the information handling resource is performing another firmware update;
   and cease the another firmware update.

17. The article of claim 15, wherein the existing public key is embedded in firmware of the information handling resource, and causing the existing public key associated with the information handling resource to be replaced with the replacement public key comprises replacing the existing public key with the replacement public key within the firmware.

18. The article of claim 15, the instructions for further causing the processor to:
   communicate an inquiry to a remote information handling system to determine if the existing private key has been compromised; and
   receive the second message in response to the inquiry.

19. The article of claim 18, the instructions for further causing the processor to periodically communicate the inquiry.

20. The article of claim 18, the instructions for further causing the processor to communicate the inquiry in response to the first message.

21. The article of claim 15, wherein causing the existing public key associated with the information handling resource to be replaced with the replacement public key comprises communicating via one of:
   management controller transport protocol (MCTP) over Peripheral Component Interconnect Express; MCTP over Inter-Integrated Circuit; and
   Keyboard Controller Style.

* * * * *